Aug. 4, 1970 R. C. RICHTER 3,522,864
TUNED VIBRATION DAMPER ASSEMBLY FOR MACHINE TOOLS
Filed May 8, 1968 3 Sheets-Sheet 1

INVENTOR.
ROBERT C. RICHTER
BY Howard F. Keiser
Ernst A. Ruf
ATTORNEYS

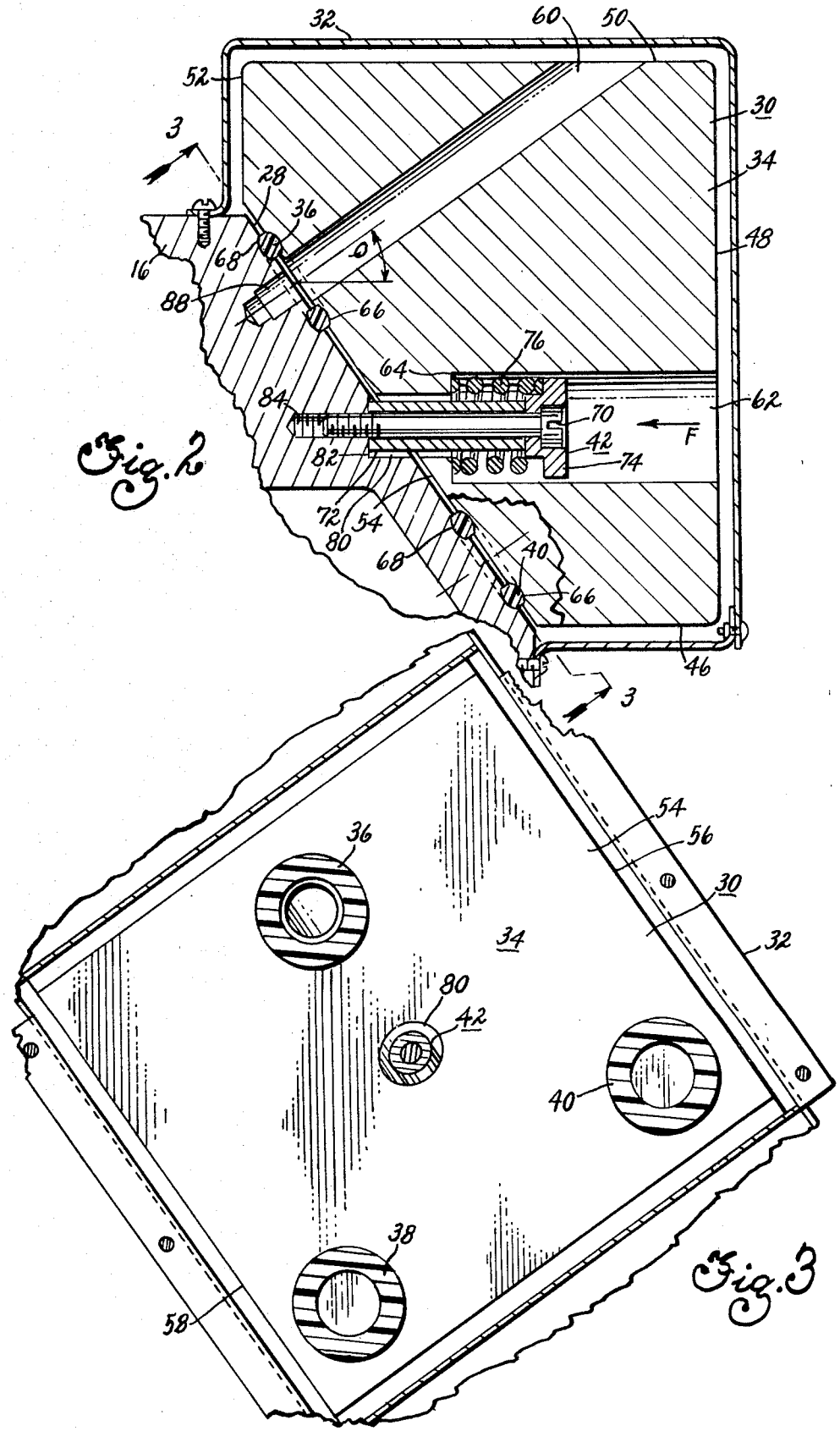

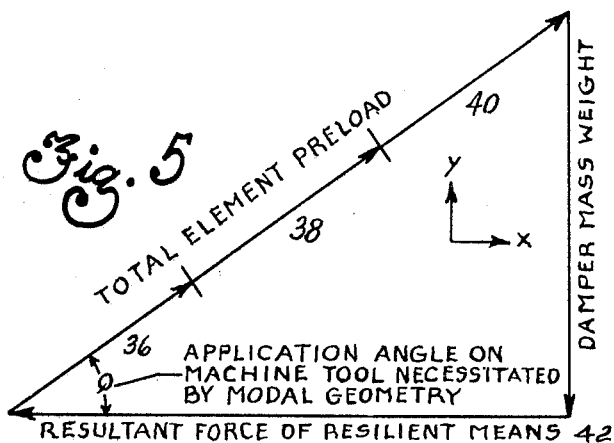
RESILIENT MEANS RESULTANT FORCE MAGNITUDE
DETERMINATION $\Sigma F_x$ AND $\Sigma F_y = 0$
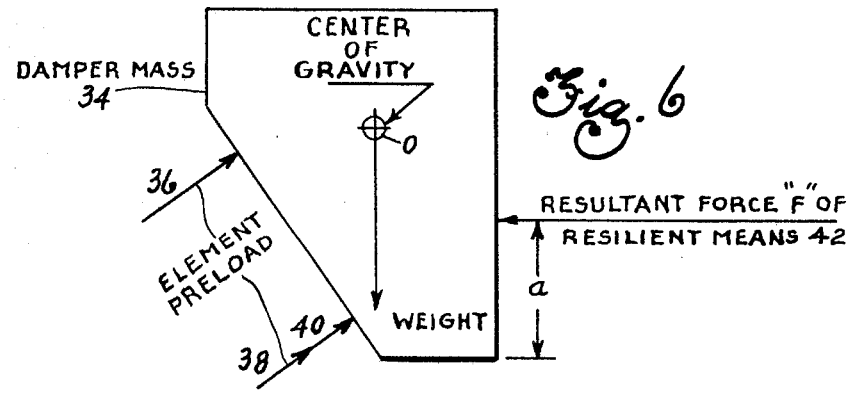
RESILIENT MEANS LOCATION DETERMINATION $\Sigma M_o = 0$
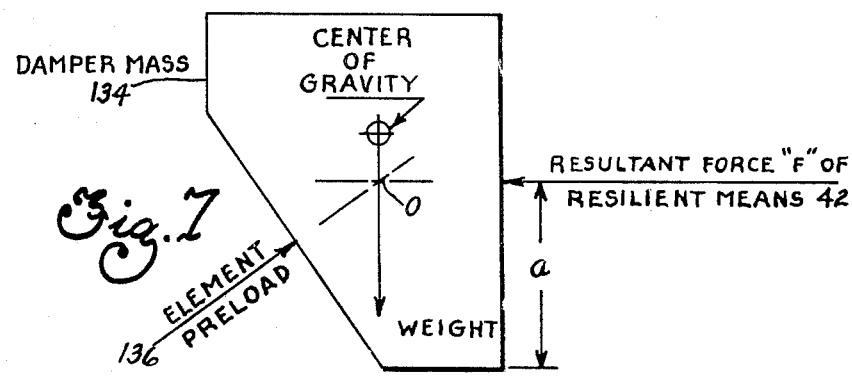
RESILIENT MEANS LOCATION DETERMINATION $\Sigma M_o = 0$ United States Patent Office 3,522,864
Patented Aug. 4, 1970

3,522,864
TUNED VIBRATION DAMPER ASSEMBLY FOR MACHINE TOOLS
Robert C. Richter, Cincinnati, Ohio, assignor to The Cincinnati Milling Machine Co., Cincinnati, Ohio, a corporation of Ohio
Filed May 8, 1968, Ser. No. 727,421
Int. Cl. F16d *63/00;* F16f *7/10*
U.S. Cl. 188—1                                    8 Claims

ABSTRACT OF THE DISCLOSURE

A vibration damper assembly for machine tools with modes of vibration having both horizontal and vertical components wherein at least one viscoelastic absorber element is interposed between the machine tool and a damper mass, with a resilent means being used to preload the viscoelastic absorber element, counterbalance the weight of the damper mass, and mount the damper mass to the machine tool at an angle determined by the vibration modal geometry of the machine tool.

BACKGROUND OF INVENTION

This invention relates to machine tools, particularly to tuned vibration damper assemblies used, for example, on tilting wheelhead type of grinding machines, and although the invention is described with reference to a grinding machine of this type, it is also applicable to other machine tools with modes of vibration having both horizontal and vertical components.

Generally, the natural frequency of a machine tool or structure without a damper assembly shows a very high resonant peak, but after a damper assembly has been installed the response curve of the machine is highly attenuated and shows two peaks instead of one. These two peaks have a much higher dynamic stiffness than the machine without a damper assembly and when the damper assembly is properly tuned, these two peaks are of approximately equal magnitude.

A tuned vibration damper assembly generally consists of a damper mass or weight that is attached to the main structure by a resilient means such as a spring and at least one preloaded viscoelastic absorber element. The values of this weight and the stiffness of the preloaded viscoelastic absorber elements are so adjusted that the natural frequency of this damper assembly is very near that of the troublesome mode of the main structure. If some oscillatory force is then applied to the main structure, which tends to cause it to vibrate, two things happen: (1) the tuned vibration damper assembly will vibrate in such a way that at all instances of time its inertia force opposes the applied oscillatory force; thus, the net force acting on the main system is greatly reduced; and (2) when the vibration damper assembly is vibrating, some energy of this system is absorbed by the preloaded viscoelastic absorber elements. The result is that the resistance of the main structure to vibration (dynamic stiffness) is increased many times.

SUMMARY OF INVENTION

Generally, the damper mass of a damper assembly is counterbalanced to eliminate nearly all static shear loads on the viscoelastic absorber elements and the viscoelastic absorber elements are preloaded to prevent slippage thereof and provide proper seating, with those function heretofore being accomplished separately using many springs oriented at different angles, this being both costly and cumbersome in operation. In addition, previously, damper assemblies were generally mounted either horizontally or vertically thereby basically disregarding any components of vibration in one of these axes.

This invention solves these problems by generally using only one resilient means strategically located in respect to the damper mass, to both preload the viscoelastic absorber elements and counterbalance the damper mass. In addition, the mounting angle of the damper mass in relation to the machine tool is determined by the vibration modal geometry of the machine tool.

In summary, this invention provides a tuned vibration damper assembly for machine tools having both horizontal and vertical components comprising a damper mass, at least one viscoelastic absorber element interposed between the machine tool and the damper mass, and a resilient means for preloading the viscoelastic absorber element and mounting the damper mass at a predetermined angle in relation to the machine tool. In addition, the mounting angle of the damper mass is determined by the vibration modal geometry of the machine tool and the resilient means also counterbalance the weight of the damper mass.

Other features and advantages to the present invention should be readily apparent by reference to the following specifications, considered in conjunction with the accompanying drawings and it is to be understood that any modification may be made in the exact structural details thereshown and described, within the scope of the appended claims without departing from or exceeding the spirit of the invention.

DRAWING DESCRIPTION

FIG. 2 is a sectional view taken generally along line 2—2 of FIG. 1 showing an installation of the tuned vibration damper assembly of this invention.

FIG. 3 is a sectional view taken generally along line 3—3 of the installation shown in FIG. 2.

FIG. 5 is a free body diagram analysis for resilient means magnitude determination of the forces acting on the damper mass.

FIG. 6 is a free body diagram analysis for resilient means location determination of the tuned vibration damper assembly shown in FIG. 2.

FIG. 7 is a free body diagram analysis for resilient means location determination of the tuned vibration damper assembly shown in FIG. 4.

DETAILED DESCRIPTION

Figure 1:
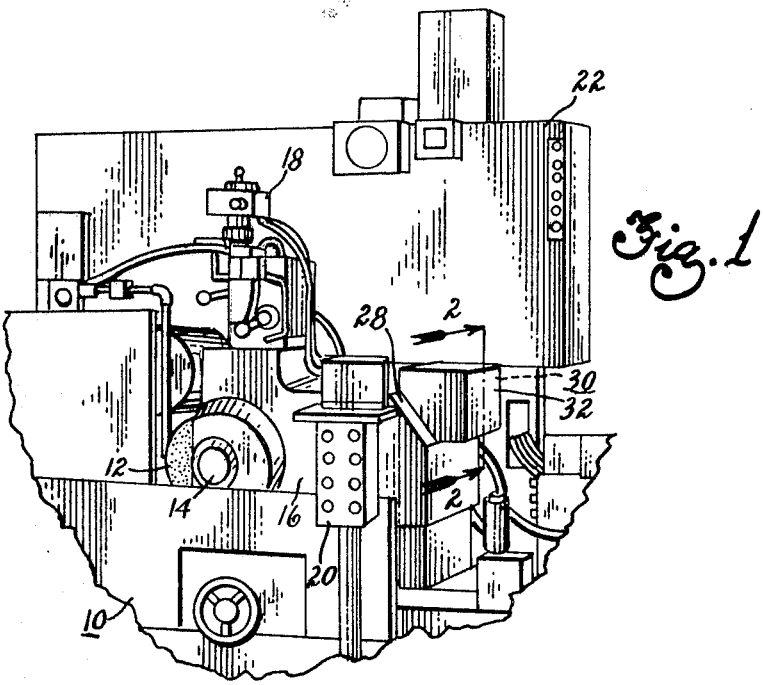
FIG. 1 is a fragmentary perspective view of a machine tool embodying this invention.

Referring now to the drawings in detail, FIG. 1 is a fragmentary perspective view of a machine tool with modes of vibration having both horizontal and vertical components as exemplified for example by a known tilting wheelhead type of grinding machine 10 having a grinding wheel 12 mounted on a spindle in a tiltable wheelhead 14 of conventional construction, retained in machine frame 16. Also shown in FIG. 1 are a grinding wheel truing mechanism 18, and various known machine function control panels 20, 22 which form no part of this invention. Mounted on angular face 28 of machine frame 16 is tuned vibration damper assembly 30 here enclosed in cover 32.

FIGS. 2 and 3, which are sectional views of the installation of tuned vibration damper assembly 30 on machine tool angular rear face 28, show damper assembly 30 to be composed of damper mass 34, viscoelastic absorber elements 36, 38, 40 and resilient means 42, all of which will now be described in detail.

Damper mass or weight 34, having bottom face 46, rear face 48, top face 50, front face 52 with angular portion 54, and side faces 56, 58, also has bore 60, bore 62 with step 64, and three viscoelastic absorber element recesses 66.

Interposed between the three viscoelastic absorber element recesses 68 on machine tool angular face 28 and the three recesses 66 in damper mass 34 are toroidally-shaped viscoelastic absorber elements 36, 38, 40 of generally comparable size, shape, and material, although these properties may be changed if needed to influence or control the vibration occurring in different machines of similar design.

Resilient means 42, comprising bolt 70, stop collar 72, spring retainer 74 and spring 76 is utilized for preloading viscoelastic absorber elements 36, 38, 40 and mounting damper mass 34 to machine tool angular face 28. Resilient means 42, capable of providing resultant force F, is placed into damper bore 62 with the lower portion of spring 76 abutting bore step 64 and bolt 70 is screwed in threaded bore 84 of machine tool angular face recess 80 until the lower portion of stop collar 72 abuts bottom 82 of recess 80. In order to facilitate the attachment of tuned vibration damper assembly 30 to angular face 28 of machine frame 16 a locating rod (not shown) may temporarily be inserted through damper mass bore 60 into blind bore 88 of machine tool angular face 28. Use of a locating rod at assembly is however optional and damper mass bore 60 may be deleted if desired.

Figure 4:
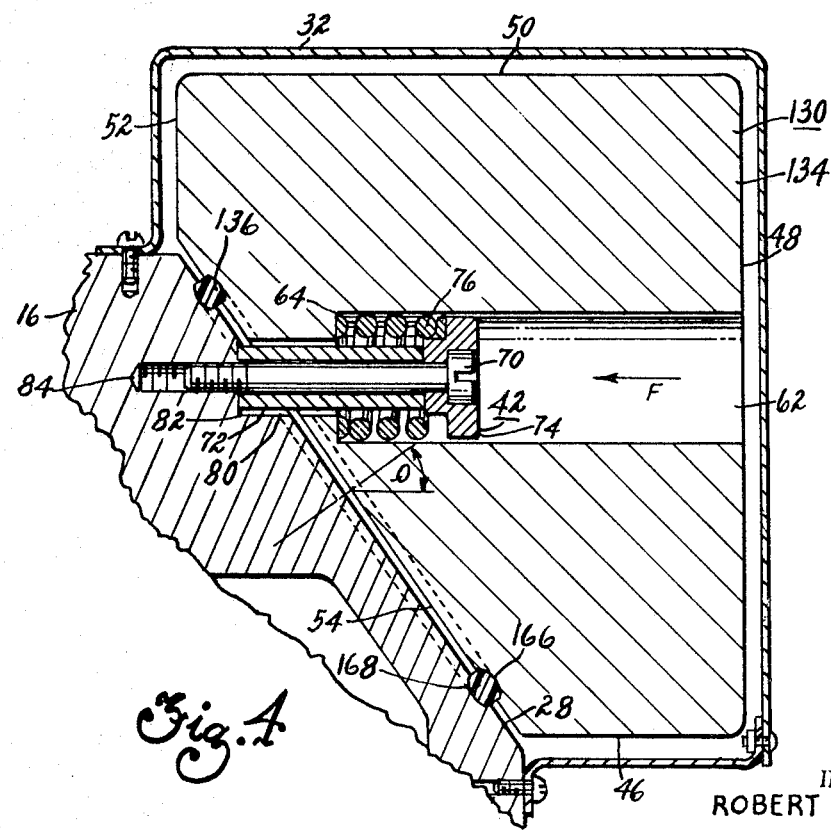
FIG. 4 is a sectional view of a modified form of the tuned vibration damper assembly shown in FIG. 2.

FIG. 4 which is a sectional view of a modified form 130 of vibration damper assembly 30 shown in FIG. 2 is very similar to damper assembly 30 and like parts are similarly numbered. Damper mass 134 is identical to damper mass 34 with the exception of the deletion of damper mass bore 60 and having but one viscoelastic absorber element recess 166. Interposed between viscoelastic absorber element recess 168 on machine tool angular face 28 and recess 166 in damper mass 134 is one toroidally shaped viscoelastic absorber element 136. Resilient means 42 is again utilized for preloading viscoelastic absorber element 136 and mounting damper mass 134 to machine tool angular rear face 28.

Once it is determined in the operation of a machine tool, such as the tilting wheelhead type grinding machine 10 of FIG. 1, which is shown by way of example only, that a tuned vibration damper assembly is necessary or would enhance performance the first step involves finding a satisfactory location, such as machine frame 16 of the machine tool 10 for mounting a vibration damper assembly, with this, of course, being influenced by the design of the machine.

The second step is the determination of the horizontal and vertical components of the motion of the mode of machine tool vibration, with the resultant direction thereof determination the application angle Q (FIGS. 2, 4, 5) of the damper mass in relation to the machine tool. It should be noted that it is desirable to locate the vibration damper assembly at the furthest possible point away from the instant center of the mode of vibration. The resultant of the components of vibration gives the proper orientation to use maximum compliance direction (minimum stiffness) of the viscoelastic absorber elements. The resultant of the components of vibration is perpendicular to the application angle Q on the machine tool since it is desirable to have the shear plane of the viscoelastic absorber elements parallel to the motion of the mode of vibration because viscoelastic absorber elements 36, 38, 40 and 136 exhibit a greater degree of compliance in this plane, with the viscoelastic absorber elements being substantially stronger in compression than in shear, therefore making orientation in a particular axis most desirable.

The third step is the determination of the weight of the damper mass 34 or 134, this being dependent upon the static stiffness and natural frequency of the machine tool to be damped as measured at the damper assembly location. This weight determination may be made by calculations using experimentally determined values in a known manner.

The fourth step involves the choosing of at least one viscoelastic absorber element having the desired stiffness. FIG. 2 shows the use of three equally spaced generally similar viscoelastic absorber elements 36, 38, 40 while FIG. 4 shows the use of single viscoelastic absorber element 136.

The fifth step is the determination of the magnitude of the resultant force F afforded by resilient means 42 and is accomplished as shown in FIG. 5 by a free body diagram analysis of the forces acting on the damper mass wherein the resilient means is selected to provide the horizontal component of the required preload so that $\Sigma F_x$ and $\Sigma F_y = 0$.

The sixth and final step is the determination of the location for the resilient means and is accomplished as shown in FIG. 6 and/or 7 by a free body diagram analysis of the forces acting on the damper mass wherein the resilient force location (length of $a$, FIGS. 6, 7) is selected so that $\Sigma M_o = 0$. This step determines the proper location of step bore 62 to allow insertion of resilient means 42 by which damper mass 34 (or 134) and viscoelastic absorber elements 36, 38, 40 (or 136) are attached to machine angular face 28 so as to preload viscoelastic absorber elements 36, 38, 40 (or 136) and to substantially counterbalance damper mass 34 (or 134) to substantially eliminate all static shear forces on said viscoelastic absorber elements.

Free body diagram analyses of absorber elements 36, 38, 40 preload force requirement and damper mass 34 weight determine the resultant force F magnitude (FIG. 5) and location (FIG. 6) of single resilient means 42 requirement of tuned vibration damper assembly 30 (FIG. 2). Similar free body diagram analyses of absorber element 136 preload force requirement and damper mass 134 weight determine the resultant force F magnitude (not shown, but same as FIG. 5 with the exception that the total element preload is supplied by single viscoelastic absorber element 136) and location (FIG. 7) of single resilient means 42 requirement of tuned vibration damper assembly 130 (FIG. 4).

It should be noted that viscoelastic absorber elements 36, 38, 40 (or 136) require preloading to prevent their slippage between damper mass front face angular portion 54 and machine tool angular face 28 as well as to assure their proper seating in recesses 66 and 68 (or 166 and 168) respectively. The element preloading force is considered to act through the axial centers of the viscoelastic absorber elements.

The direction of resultant force F of resilient means 42 need not necessarily be in a horizontal plane as shown in the drawings but it is preferred for machining convenience.

The desired magnitude of resultant force F provided by resilient means 42 is best controlled by the use of a limiting means such as stop collar 72 so that only the required force magnitude is used by the assembler since the use of stop collar 72 accurately limits the compressed height of spring 76. Of course, stop collar 72 may be deleted if the compressed height of spring 76 is accurately controlled in another manner such as by turning bolt 70 a predetermined number of turns, etc.

The tuned vibration damper assembly 30 or 130 of this invention is unique in that it generally utilizes only one resilient means 42, strategically located in respect to damper mass 34 or 134 to preload viscoelastic absorber elements 36, 38, 40 or 136, and mount damper masses 34 or 134 to machine tool surface 28 as well as counterbalance damper mass 34 or 134. The use of only one resilient means 42 is preferred but, if for example one resilient means 42 cannot provide the required resultant force F magnitude (FIG. 5), multiples of resilient means 42 may be utilized at the same location distance $a$ (FIGS. 6, 7). Heretofore, these mounting, preloading and counterbalancing functions were accomplished separately using many springs oriented at different angles.

Another unique feature of this invention is that mounting angle Q of damper mass 30 or 130 in relation to machine tool 10 is determined by the vibration modal geometry of the machine tool, i.e., the resultant of the horizontal and vertical components of the troublesome mode of vibration of the machine tool.

While the invention has been described in connection with possible forms or embodiments thereof, it is to be understood that the present disclosure is illustrative rather than restrictive and that changes or modification may be resorted to without departing from the spirit of the invention or scope of the claims which follow.

What is claimed is:

1. A tuned vibration damper assembly for machine tools with modes of vibration having both horizontal and vertical components comprising:
   (a) a damper mass mounted on the machine tool;
   (b) at least one viscoelastic absorber element interposed between the machine tool and said damper mass;
   (c) resilient means for preloading said viscoelectric absorber elements and mounting said damper mass at a predetermined angle in relation to the machine tool, wherein the mounting angle of said damper mass is the resultant direction of the horizontal and vertical components of the motion of the mode of vibration of the machine tool.

2. The tuned vibration damper assembly of claim 1 wherein the weight of said damper mass is determined by the static stiffness and natural frequency of the mode of vibration of the machine tool measured at the damper assembly location.

3. The tuned vibration damper assembly of claim 2 wherein said resilient means also counterbalances the weight of the damper mass.

4. The tuned vibration damper assembly of claim 3 wherein the magnitude of the resultant force afforded by said resilient means is selected so that $\Sigma F_x$ and $\Sigma F_y$ is zero.

5. The tuned vibration damper assembly of claim 4 with the addition of a limiting means for limiting the movement of said resilient means to the predetermined magnitude.

6. The tuned vibration damper assembly of claim 5 wherein the location of said resilient means is selected so that $\Sigma M_o$ of the damper mass is zero.

7. The tuned vibration damper assembly of claim 6 wherein said resilient means comprises a spring, a spring retainer and a bolt.

8. The tuned vibration damper assembly of claim 7 utilizing at least three viscoelastic absorber elements.

References Cited

UNITED STATES PATENTS

| | | |
|---|---|---|
| 1,657,390 | 1/1928 | Halikman. |
| 2,721,028 | 10/1955 | Dills. |
| 2,960,189 | 11/1960 | Osburn. |
| 3,242,791 | 3/1966 | Smith. |

DUANE A. REGER, Primary Examiner

U.S. Cl. X.R.

188—103